United States Patent Office 3,751,504
Patented Aug. 7, 1973

---

3,751,504
VAPOR-PHASE ALKYLATION IN PRESENCE OF CRYSTALLINE ALUMINOSILICATE CATALYST WITH SEPARATE TRANSALKYLATION
Philip E. Keown, Clyde C. Meyers, and Robert G. Wetherold, Beaumont, Tex., assignors to Mobil Oil Corporation
Filed May 12, 1972, Ser. No. 252,884
Int. Cl. C07c *3/62, 3/52*
U.S. Cl. 260—672 T    28 Claims

ABSTRACT OF THE DISCLOSURE

A process is provided for alkylation of aromatic hydrocarbons by contacting same with an alkylating agent in a reaction zone maintained under conditions such that said alkylation is accomplished in the vapor-phase and in the presence of a catalyst comprising a crystalline aluminosilicate zeolite characterized by a unique X-ray diffraction pattern, said catalyst under said conditions being capable of affording a high and selective yield of desired alkylaromatic product. Said alkylation process is accompanied by a system for transalkylation of the polyalkylaromatic portion of the effluent from said alkylation process. There is also provided, when said reaction zone is comprised of a series of reactor stages, a quench for effluent from said stages between said stages. Also, a catalyst steam regeneration method is provided.

CROSS-REFERENCE TO RELATED APPLICATION

The subject matter of this application is related to that of application Ser. No. 252,776 filed on the same date herewith and entitled Vapor-Phase Alkylation in Presence of Crystalline Aluminosilicate Catalyst.

BACKGROUND OF THE INVENTION

Field of the invention

This invention is directed to the vapor-phase alkylation of aromatic hydrocarbons, including aromatic hydrocarbons containing a non-polar substituent, e.g. benzene or toluene, with an alkylating agent, e.g. an olefin, wherein the alkylation is performed in the presence of a new crystalline aluminosilicate zeolite characterized by long catalyst life, capable of affording high selectivity to desired products, e.g. alkylaromatics, and which is easily and effectively regenerated, when necessary, without substantial loss in activity. This alkylation method is accompanied by a vapor-phase transalkylation system, separate from said alkylation system, for transalkylation of the polyalkylaromatic portion of the effluent from said alkylation reaction.

This invention is further directed to said vapor-phase alkylation of aromatic hydrocarbons wherein said alkylation is performed in a series of adiabatic reactor stages containing said new crystalline aluminosilicate zeolite and wherein the effluent from said stages is contacted with a quench comprising aromatic hydrocarbon charge whereby heat of reaction is dissipated between said stages.

Further, this invention is directed to use of steam as the major inert diluent carrier of oxygen to provide controlled burning of said zeolite to remove coke and restore catalytic activity to said zeolite when regeneration of said zeolite is required.

Discussion of the prior art

Alkylation of aromatic hydrocarbon compounds employing certain crystalline aluminosilicate zeolite catalysts is known in the art. For instance, U.S. Pat. 3,251,897 describes liquid phase alkylation in the presence of crystalline aluminosilicates such as faujasite, heulandite, clinoptilolite, mordenite, dachiardite, zeolite X and zeolite Y. The temperature of such alkylation procedure does not exceed 600° F., thereby maintaining patentee's preferable operating phase as substantially liquid.

Also, U.S. Pat. 2,904,607 shows alkylation of hydrocarbon compounds in the presence of certain crystalline aluminosilicate zeolites. The zeolites described for use in this patent are crystalline metallic aluminosilicates, such as, for example, magnesium aluminosilicate.

U.S. Pats. 3,631,120 and 3,641,177 describe a liquid phase process for alkylation of aromatic hydrocarbons with olefins in the presence of certain zeolites. U.S. Pat. 3,631,120 discloses use of an ammonium exchanged, calcined zeolite having a silica to alumina mole ratio of between 4.0 and 4.9. U.S. Pat. 3,641,177 discloses use of a zeolite catalyst activated in a particular manner.

Unfortunately, while the crystalline aluminosilicate catalysts proposed for such alkylation methods provide satisfactory initial yields of desired products, for the most part, their catalytic aging properties are not sufficiently good enough to warrant commercial application. Hence, it is of advantage to provide a satisfactory process for alkylating aromatic hydrocarbons using a crystalline aluminosilicate zeolite catalyst which has improved aging properties, i.e. maintains alkylation in high yield over a long, commercially attractive period of time, heretofore lacking in the art.

SUMMARY OF THE INVENTION

This invention contemplates a process for effecting vapor-phase alkylation of aromatic hydrocarbons, including aromatic hydrocarbons containing a non-polar substituent, which comprises contacting the aromatic hydrocarbon charge with an alkylating agent under conditions effective for accomplishing said vapor-phase alkylation including a reactor inlet temperature between about 650° F. and about 900° F., with a reactor bed temperature as much as 150° F. above the reactor inlet temperature, a pressure between atmospheric and 3000 p.s.i.g., employing a mole ratio of aromatic hydrocarbon to alkylating agent in the approximate range of 1:1 to 20:1 and a total feed weight hourly space velocity (WHSV) between about 2 and about 2000, in the presence of a catalyst comprising a crystalline aluminosilicate zeolite characterized by a unique specified X-ray powder diffraction pattern. The new crystalline aluminosilicate zeolite used as a catalyst in the process of this invention is represented by the general formula, expressed in terms of mole ratios of oxides, as follows:

$$0.9 \pm 0.2 \, M_{2/n} O : Al_2O_3 : 5\text{-}300 SiO_2 : zH_2O$$

wherein M is a cation, predominately hydrogen, $n$ is the valence of M and $z$ is from 0 to 40.

Said alkylation process is accompanied by a vapor-phase transalkylation system, separate from said alkylation system, the method of which comprises contacting a portion of the effluent from said alkylation process comprising polyalkylaromatic compounds with aromatic hydrocarbon charge in the presence of the above-defined catalyst and under conditions including a transalkylation reactor in- let temperature between about 650° F. and 900° F., a transalkylation reactor pressure between atmospheric and about 3000 p.s.i.g., employing a mole ratio of aromatic hydrocarbon charge to polyalkylaromatic compounds of between 1:1 to 16:1 and a WHSV between about 10 and 1000.

The above weight hourly space velocities are based upon the weight of crystalline aluminosilicate.

Also contemplated herein is the use of a series of adiabatic reactor stages within which said alkylation contacting occurs. Also, the effluent from such reactor stages is contacted with quench comprising aromatic hydrocarbon charge whereby the heat of reaction is dissipated between said stages.

DESCRIPTION OF SPECIFIC EMBODIMENTS

The catalysts useful in this invention belong to the family of zeolites known as zeolite ZSM-5. In a preferred synthesized form, the zeolite for use in the process of this invention has a formula, in terms of mole ratios of oxides, as follows:

wherein M is selected from the group consisting of a mixture of alkali metal cations, especially sodium, and tetraalkylammonium cations, the alkyl groups of which preferably contain 2 to 5 carbon atoms. Particularly preferred is a zeolite having the formula:

The original cations are replaced, in accordance with techniques well known in the art, at least in part, by ion exchange with hydrogen or hydrogen precursor cations. Although other cations may be used to replace the original cations, such as, for example, certain metal ions, a substantial portion of such replacing ions should be hydrogen or hydrogen precursor, such as ammonium, ions. Hydrogen ions in the finished catalyst are preferred since they render the zeolite catalytically active for alkylation of aromatic hydrocarbon compounds, such as, for example, benzene, anthracene, naphthalene and toluene.

Members of the family of zeolites designated herein as ZSM-5 have an exceptionally high degree of thermal stability thereby rendering them particularly effective for use in processes involving elevated temperatures. In this connection, ZSM-5 zeolites appear to be one of the most stable families of zeolites known to date. However, it has been found that the alkylation process of this invention may be carried out at reactor bed temperatures not in excess of about 1050° F., which eliminates many undesirable reactions that occur in catalytic alkylation of hydrocarbons carried out at higher temperatures. The deleterious effects of these reactions cause several basic problems for alkylation processes. At reactor bed temperatures substantially above 1050° F., the reactants and the alkylated products undergo degradation resulting in the loss of desired products and reactants. Undesirable residues are formed from the degradation reactions. In addition, olefins used as alkylating agents will polymerize with themselves or other reactants to form resinous compounds within the reaction zone. These resinous compounds together with the degradation products lead to the formation of coke-like deposits on the active surfaces of the catalyst. As a result, these deposits rapidly destroy the high activity of the catalyst and greatly shorten its effective life. Such undesirable effects are obviated under the conditions and with the catalyst employed in the present process.

Members of the family of ZSM-5 zeolites for use in the present invention possess a definite distinguishing crystalline structure whose X-ray diffraction pattern shows the following significant lines:

TABLE 1

| Interplanar spacing $d$ (A.): | Relative intensity |
|---|---|
| 11.1±0.3 | S |
| 10.0±0.3 | S |
| 7.4±0.2 | W |
| 7.1±0.2 | W |
| 6.3±0.2 | W |
| 6.04±0.2 | W |
| 5.56±0.1 | W |
| 5.01±0.1 | W |
| 4.60±0.08 | W |
| 4.25±0.08 | W |
| 3.85±0.07 | VS |
| 3.71±0.05 | S |
| 3.04±0.03 | W |
| 2.99±0.02 | W |
| 2.94±0.02 | W |

These values were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100I/I_o$, where $I_o$ is the intensity of the strongest line or peak, and $d$ (obs.), the interplanar spacing in A, corresponding to the recorded lines, were calculated. In Table 1 the relative intensities are given in terms of the symbols W=weak, S=strong and VS=very strong. It should be understood that this X-ray diffraction pattern is characteristic of all the species of ZSM-5 zeolites. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder dicraction patterns of several of these forms are set forth below. The ZSM-5 forms set forth below are all aluminosilicates.

TABLE 2

[X-ray diffraction—ZSM-5 powder in cation exchanged forms, $d$ spacings observed]

| As made | HCl | NaCl | CaCl₂ | RECl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
|  |  | 9.01 | 9.02 |  | 8.99 |
| 8.06 |  |  |  |  |  |
| 7.44 | 7.46 | 7.46 | 7.46 | 7.40 | 4.46 |
| 7.08 | 7.07 | 7.09 | 7.11 |  | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 |  | 5.38 | 5.37 | 5.38 | 5.37 |
| 5.13 | 5.11 | 5.14 | 5.12 | 5.14 |  |
| 4.99 | 5.01 | 5.01 | 5.01 | 5.01 | 5.01 |
|  |  | 4.74 |  |  |  |
| 4.61 | 4.62 | 4.62 | 4.61 | 4.63 | 4.62 |
|  |  | 4.46 | 4.46 |  | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 |  | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
|  | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 |  |  | 3.17 | 3.18 |  |

TABLE 2—Continued

| As made | HCl | NaCl | CaCl₂ | RECl₃ | AgNO₃ |
|---|---|---|---|---|---|
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
|  |  |  |  | 2.97 |  |
|  | 2.95 | 2.95 | 2.94 | 2.95 | 2.95 |
| 2.86 | 2.87 | 2.87 | 2.87 | 2.87 | 2.87 |
| 2.80 |  |  |  |  |  |
| 2.78 |  |  | 2.78 |  | 2.78 |
| 2.73 | 2.74 | 2.74 | 2.73 | 2.74 | 2.74 |
| 2.67 |  |  | 2.68 |  |  |
| 2.66 |  |  | 2.65 |  |  |
| 2.60 | 2.61 | 2.61 | 2.61 | 2.61 | 2.61 |
|  | 2.59 |  | 2.59 |  |  |
| 2.57 |  | 2.57 | 2.56 |  | 2.57 |
| 2.50 | 2.52 | 2.52 | 2.52 | 2.52 |  |
| 2.49 | 2.49 | 2.49 | 2.49 | 2.49 | 2.49 |
|  |  |  | 2.45 |  |  |
| 2.41 | 2.42 | 2.42 | 2.42 | 2.42 |  |
| 2.39 | 2.40 | 2.40 | 2.39 | 2.40 | 2.40 |
|  |  |  | 2.38 | 2.35 | 2.38 |
|  | 2.33 |  | 2.33 | 2.32 | 2.33 |
|  | 2.30 |  |  |  |  |
|  | 2.24 | 2.23 | 2.23 |  |  |
|  | 2.20 | 2.21 | 2.20 | 2.20 |  |
|  | 2.18 | 2.18 |  |  |  |
|  |  | 2.17 | 2.17 |  |  |
|  | 2.13 |  | 2.13 |  |  |
|  | 2.11 | 2.11 |  | 2.11 |  |
|  |  |  | 2.10 | 2.10 |  |
|  | 2.08 | 2.08 |  | 2.08 | 2.08 |
|  |  | 2.07 | 2.07 |  |  |
|  |  |  | 2.04 |  |  |
| 2.01 | 2.01 | 2.01 | 2.01 | 2.01 | 2.01 |
| 1.99 | 2.00 | 1.99 | 1.99 | 1.99 | 1.99 |
|  |  |  | 1.97 | 1.96 |  |
| 1.95 | 1.95 | 1.95 | 1.95 | 1.95 |  |
|  |  |  |  | 1.94 |  |
|  | 1.92 | 1.92 | 1.92 | 1.92 | 1.92 |
| 1.91 |  |  |  | 1.91 |  |
|  |  |  |  | 1.88 |  |
| 1.87 | 1.87 | 1.87 | 1.87 | 1.87 | 1.87 |
|  | 1.86 |  |  |  |  |
| 1.84 | 1.84 |  |  | 1.84 | 1.84 |
| 1.83 | 1.83 | 1.83 | 1.83 | 1.83 |  |
| 1.82 |  | 1.81 |  | 1.82 |  |
| 1.77 | 1.77 | 1.79 | 1.78 |  | 1.77 |
| 1.76 | 1.76 | 1.76 | 1.76 | 1.76 | 1.76 |
|  |  | 1.75 |  |  | 1.75 |
|  | 1.74 | 1.74 | 1.73 |  |  |
| 1.71 | 1.72 | 1.72 | 1.71 |  | 1.70 |
| 1.67 | 1.67 | 1.67 |  | 1.67 | 1.67 |
| 1.66 | 1.66 |  | 1.66 | 1.66 | 1.66 |
|  |  | 1.65 | 1.65 |  |  |
|  |  | 1.64 | 1.64 |  |  |
|  | 1.63 | 1.63 | 1.63 | 1.63 | 1.62 |
|  | 1.61 | 1.61 | 1.61 |  | 1.61 |
| 1.58 |  |  |  |  |  |
|  |  | 1.57 |  | 1.57 | 1.57 |
|  |  | 1.56 | 1.56 | 1.56 |  |

Zeolite ZSM–5 for use in this invention can be suitably prepared by preparing a solution containing tetrapropylammonium hydroxide, sodium oxide, an oxide of aluminum, an oxide of silicon and water having a composition, in terms of mole ratios of oxides, falling within the following ranges:

TABLE 3

|  | Acceptable | Preferred | Particularly preferred |
|---|---|---|---|
| OH⁻/SiO₂ | 00.7–10.0 | 0.1–0.8 | 0.2–0.75 |
| R₄N+/(R₄N++Na) | 0.2–0.95 | 0.3–0.9 | 0.4–0.9 |
| H₂O/OH⁻ | 10–300 | 10–300 | 10–300 |
| SiO₂/Al₂O₃ | 5–300 | 10–100 | 10–60 | wherein R is propyl and maintaining the mixture until crystals of the zeolite are formed. It is noted that an excess of tetrapropylammonium hydroxide can be used which would raise the value of OH⁻/SiO₂ above the ranges set forth above. The excess hydroxide, of course, does not participate in the reaction. Thereafter, the crystals are separated from the liquid and recovered. Typical reaction conditions consist of heating the foregoing reaction mixture to a temperature of from about 100° C. to 175° C. for a period of time of from about six hours to 60 days. A more preferred temperature range is from about 150° C. to 175° C. with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g. at 230° F., for from about 8 to 24 hours. Of course, milder conditions may be employed if desired, e.g. room temperature under vacuum.

To prepare the preferred form of the catalyst for use herein, the composition can be prepared utilizing materials which supply the appropriate oxide. Such compositions include sodium aluminate, alumina, sodium silicate, silica hydrosol, silicic gel, silicic acid, sodium hydroxide and tetrapropylammonium compounds, e.g. tetrapropylammonium hydroxide. It will be understood that each oxide component utilized in the reaction mixture for preparing a member of the ZSM–5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The hydrogen cation can be supplied by an aqeous solution of hydrogen chloride or ammonium salt, such as ammonium chloride or ammonium nitrate. The reaction mixture can be prepared either batchwise or continuously. Crystal size and crystallization time of the ZSM–5 composition will vary with the nature of the reaction mixture employed.

For the alkylation process of this invention, if desired, the ZSM–5 zeolite catalyst can be employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite and kieselguhr. The relative proportion of crystalline aluminosilicate ZSM–5 of the total composition of catalyst and binder or support may vary widely with the ZSM–5 content ranging from between about 1 to about 90 percent by weight and more usually in the range of about 5 to about 80 percent by weight of the composition.

Exemplary of the hydrocarbons which may be alkylated by the process of this invention are aromatic compounds such as benzenes, naphthalenes, anthracenes, and the like and substituted derivatives thereof; and alkyl substituted aromatics, e.g. toluene, xylene, and homologs thereof. In addition, other non-polar substituent groups may also be attached to the nucleus of the aromatic ring including by way of example Methyl (—CH₃)
Ethyl (—C₂H₅)
Tert-butyl (—C(CH₃)₃)
Alkyl (—C$_n$H$_{(2n+1)}$)
Cycloalkyl (—C$_n$H$_{(2n-1)}$)
Phenyl (C₆H₅)
Naphthyl (C₁₀H₇) and
Aryl (any aromatic radical)

In accordance with this invention, the preferred alkylating agents are olefins such as ethylene, propylene, dodecylene, as well as formaldehyde, alkyl halides and alcohols; the alkyl portion thereof having from 1 to 24 carbon atoms. Numerous other acyclic compounds having at least one reactive alkyl radical may be utilized as alkylating agents.

Operating conditions employed in the process of the present invention are critical and will be dependent, at least in part, on the specific alkylation reaction being effected. Such conditions as temperature, pressure, space velocity and molar ratio of the reactants and the presence of inert diluents will have important affects on the process. Accordingly, the manner in which these conditions affect not only the conversion and distribution of the resulting alkylated products but also the rate of deactivation of the catalyst will be described below.

The process of this invention is conducted such that alkylation of an aromatic hydrocarbon compound, exemplified by benzene, with an alkylating agent, such as an olefin, exemplified by ethylene, is carried out in the vapor-phase by contact in a reaction zone, such as, for example, a fixed bed of catalyst, under alkylation effective conditions, said catalyst being characterized as the above-defined ZSM-5 which has been hydrogen exchanged such that a predominate portion of its exchangeable cations are hydrogen ions. In general, it is contemplated that more than 50 percent and preferably more than 75 percent of the cationic sites of the ZSM-5 zeolite will be occupied by hydrogen ions. The alkylatable aromatic compound and alkylating agent are desirably fed to a first stage at an appropriate mole ratio of one to the other. The feed to such first stage is heated. After some reaction takes place, such as, for example, when about 80 percent of the alkylating agent is consumed, the effluent of the first stage is cooled to remove heat of reaction and more alkylating agent is added (second stage) to maintain the mole ratio of aromatic compound to alkylating agent within the range established for the first stage.

Although cooling between reactor stages to remove heat of reaction may be accomplished in many ways, the preferred method is by quenching with condensed reactor effluent to dissipate such heat. Such condensed reactor effluent would have a higher aromatic compound content and a quench stream with a high aromatic compound content is desirable since a higher aromatic compound to alkylating agent mole ratio results in higher selectivity toward desired alkylaromatics.

Also, and since cooling of the reaction zone would require a costly system, it is desirable to have an alkylation reactor which is a series of adiabatic reactor stages with alkylating agent injection and quenching between such stages.

The benefits obtained by the quenching method of the present invention are numerous. Aside from excellent temperature control, the use of condensed reactor effluent as quench eliminates the need for costly intercoolers between reactor stages. Also, other noticeable benefits resulting from quenching according to this invention are summarized as follows:

(1) The aromatic hydrocarbon to alkylating agent ratio is higher than without such quenching, resulting in improved selectivity, and
(2) A larger heat sink is provided.

The higher aromatic hydrocarbon feed rate resulting from use of condensed reactor effluent as quench does not adversely effect reactor performance of alkylating agent conversion or catalyst aging.

Figure 2:
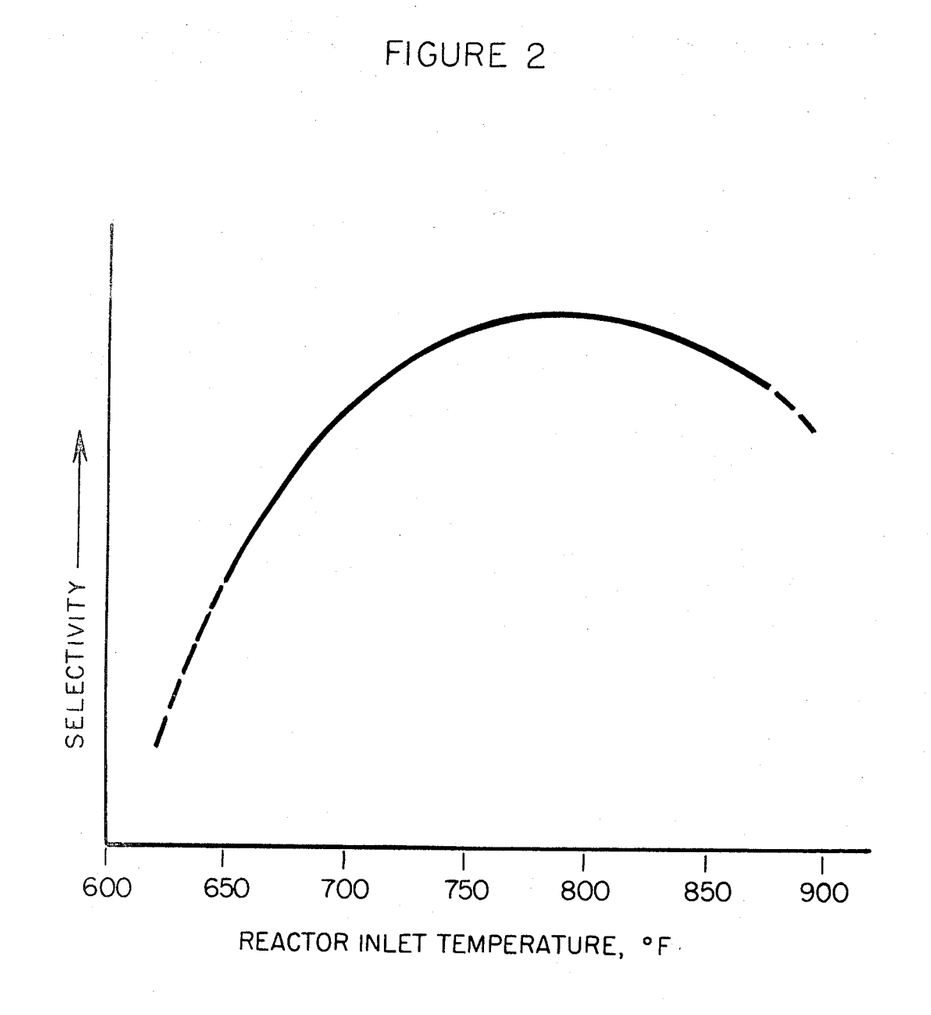
FIG. 2 is a plot of selectivity to desired products versus reactor inlet temperature for a typical vapor-phase process of the present invention.

Considering vapor-phase alkylation of benzene with ethylene, the first stage mole ratio of benzene to ethylene may be in the range of about 1:1 to about 20:1. The first stage feed is heated to a temperature within the range of about 650° F. to about 900° F. at a pressure within the range of about atmospheric to about 3000 p.s.i.g. Preferred inlet temperatures fall within the range of about 700° F. to about 850° F., as shown in FIG. 2, and preferred pressures fall within the range of about 25 p.s.i.g. to about 450 p.s.i.g. The repeating of reaction staging is carried out while maintaining an overall aromatic hydrocarbon, e.g. benzene, to alkylating agent, e.g. ethylene, mole ratio of about 1:1 to about 20:1, with a preferred range of about 2.5:1 to about 16:1.

A transalkylation reactor separate from the alkylation reactor stages affords additional benefits. Using such techniques, dialkylaromatics and aromatic charge are passed together over a catalyst bed of ZSM-5 crystalline aluminosilicate zeolite. This is done with an aromatic compound to dialkylaromatic compounds mole ratio of between 1:1 and 16:1, with a preferable range of between about 2.5:1 to about 12:1. The WHSV of aromatic compound based upon the weight of crystalline aluminosilicate is between 10 and 1000 with a preferable range between about 20 and 200. The transalkylation reactor inlet temperature and reactor pressure will be of the same range as for the alkylation part of the present invention.

Benefits of having such a separate transalkylation reactor are numerous. Examples of such benefits are:

(1) Transalkylation according to this invention is accomplished with very high selectivity to desired product, i.e. alkylaromatics, at a low mole ratio of aromatic compound to dialkylaromatic compounds,
(2) Transalkylation according to this invention causes negligible deactivation of the ZSM-5 catalyst employed, and
(3) Such transalkylation converts some of the other components of the dialkylaromatic stream, i.e. other polyalkylaromatic compounds, to desired product.

Figure 1:
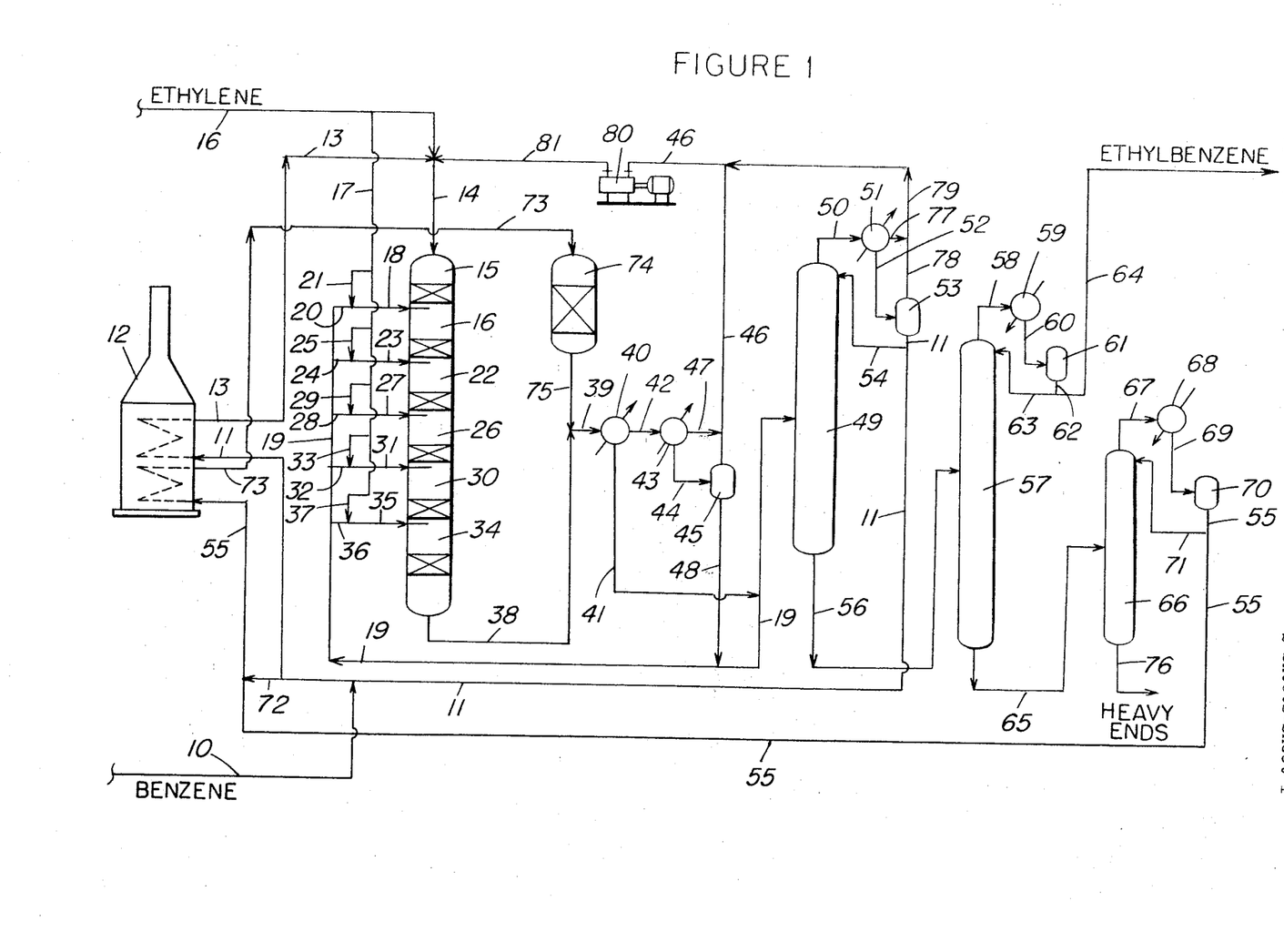
FIG. 1 is a schematic flow diagram of a typical vapor-phase process of the present invention.

A multi-stage condensation of the reactor product is desired since a quench containing a higher concentration of aromatic charge than the combined reactor effluent is possible. As shown in FIG. 1 of the drawings, the condensed reactor effluent not used as a quench may be fed to a series of distillation columns.

Referring more particularly to FIG. 1, which shows the process of the present invention for alkylation of benzene with ethylene, benzene is introduced through conduits 10 and 11 and passes through heater 12, where it is vaporized, and then through conduits 13 and 14 into the first stage 15 of the alkylation reactor. Ethylene is introduced through conduit 16 into manifold 17 and conduit 14, where it is mixed with vaporized benzene from conduit 13, and thereafter into the first stage 15 of the reactor.

Effluent from first stage 15 passes to second stage 16 of the reactor and is replenished with ethylene and benzene from conduit 18. Such replenishment acts as the quench hereinbefore discussed. Conduit 18 is fed benzene from manifold 19 via conduit 20 and is fed ethylene from manifold 17 via conduit 21.

Effluent from second stage 16 passes to third stage 22 and is replenished with ethylene and benzene from conduit 23. Again, the above replenishment acts as the quench hereinbefore discussed. Conduit 23 is fed benzene from manifold 19 via conduit 24 and is fed ethylene from manifold 17 via conduit 25.

Effluent from third stage 22 passed to fourth stage 26 and is replenished with benzene and ethylene from conduit 27. Again, such replenishment is quench. Conduit 27 is fed benzene from manifold 19 via conduit 28 and is fed ethylene from manifold 17 via conduit 29.

Effluent from fourth stage 26 passes to fifth stage 30, whereupon additional benzene and ethylene are delivered by conduit 31. Such additional component acts as quench as hereinbefore discussed. Conduit 31 is fed benzene from manifold 19 via conduit 32 and is fed ethylene from manifold 17 via conduit 33.

Effluent from fifth stage 30 passes to sixth stage 34 and is replenished with benzene and ethylene from conduit 35. The replenishment again acts as quench. Conduit 35 is fed benzene from manifold 19 via conduit 36 and is fed ethylene from manifold 17 via conduit 37.

The total reaction product mixture exits from the sixth stage 34 of the reactor and passes via conduits 38 and 39 through high pressure steam condenser 40, wherein condensate passes via conduit 41 into manifold 19. The uncondensed reactor product mixture then passes via conduit 42 through low pressure steam condenser 43 from where condensate passes to separator 45 via conduit 44. Unreacted ethylene is removed as overhead from separator 45 via conduit 46, wherein it is mixed with the uncondensed product mixture from condenser 43 via conduit 47. The liquid bottom product of separator 45 is injected into manifold 19 via conduit 48. A portion of the product mixture in manifold 19 which does not pass back to reactor stages 15, 16, 22, 26, 30 and 34 via conduit 20, 24, 28, 32 and 36, respectively, passes to a first distillation column 49.

From distillation column 49, unreacted benzene passes overhead via conduit 50 into low pressure steam condenser 51. Condensate from condenser 51 passes to separator 53 via conduit 52. A portion of the separated liquid leaves separator 53 via conduit 11 and a part of that liquid is fed back to distillation column 49 as recycle via conduit 54. The remainder of the liquid leaving separator 53 via conduit 11, which does not become recycle to column 49, continues along conduit 11 back to where it is injected with benzene feed via conduit 10. Thereafter, a portion of the components of conduit 11, i.e. benzene from conduit 10 and the heavier part of the distillate from column 49, which is not introduced into conduit 55 via conduit 72 is used as alkylation reactor feed as defined above.

The uncondensed portion of the contents of condenser 51 and the overhead from separator 53 are brought together via conduits 77 and 78, respectively, into conduit 79. The contents of conduit 79 are introduced into conduit 46. Thereafter, the contents of conduit 46 pass through compressor 80 to conduit 81. The contents of conduit 81 then are injected into combination with the contents of conduit 13 and 16, which combination follows conduit 14 to the alkylation reactor first stage 15.

The bottoms from column 49 pass via conduit 56 to second distillation column 57. The desired alkylation product, i.e. ethylbenzene, passes overhead as distillate via conduit 58, into cold water condenser 59 and into separator 61 via conduit 60. A portion of ethylbenzene product from separator 61 is recycled back to column 57 via conduits 62 and 63. Final ethylbenzene product is collected via conduit 64.

The bottoms from column 57 pass via conduit 65 to third distillation column 66. Polyalkylaromatic compounds, i.e. polyethylbenzenes, pass overhead via conduit 67 through cold water condenser 68 and to separator 70 via conduit 69. A portion of the liquid product from separator 70 is recycled back to column 66 via conduits 55 and 71. The remainder of the polyethylbenzenes not recycled to column 66 progress through conduit 55 to where a portion from conduit 11, downstream from benzene injection via conduit 10, is introduced via conduit 72. Thereafter, the content mixture of conduit 55, i.e. benzene and polyethylbenzenes, passes through heater 12, where it is vaporized, and then through conduit 73 into the separate transalkylation reactor 74. A transalkylated product primarily consisting of ethylbenzene exits reactor 74 via conduit 75 and is combined with the contents of conduit 38 to become the contents of conduit 39. The bottoms product of column 66, consisting of heavy ends, i.e. products heavier than polyethylbenzene, are removed from the lower portion of column 66 via conduit 76.

It is noted that extremely high total feed space velocities are possible in the process of this invention, i.e. up to 2000 lb. total feed/hr.-lb. crystalline aluminosilicate. An important factor in the present process is, however, the WHSV of the alkylating agent, e.g. ethylene. The alkylating agent WHSV to each of any alkylation reactor stages is maintained between about 1 and about 10 lbs. alkylating agent/hr.-lb. crystalline aluminosilicate. The most desirable ethylene, i.e. alkylating agent, WHSV is within the range of about 2 to about 6 lbs. ethylene/hr.-lb. crystalline aluminosilicate. When the ethylene WHSV is maintained within the above limits, an economical cycle between regenerations of catalyst exists.

In particular reference to FIG. 2, which shows a plot of selectivity to desired products (e.g. ethylbenzene) versus reactor inlet temperature for a specific vapor-phase process of the present invention, it is observed that, under the specific conditions of that process selectivity increases from low value at below about 650° F. to a high value at between about 700° F. and 850° F. The specific condition of the process accounting for the plot of FIG. 2 are as follows:

| | |
|---|---|
| Feed | Benzene. |
| Alkylating agent | Ethylene. |
| Feed to alkylating agent mole ratio | 5.5 to 1. |
| WHSV, lb./hr.-lb. crystalline aluminosilicate | 88. |
| Pressure, p.s.i.g. | 260. |

The following examples will serve to illustrate the process of the invention, without unduly limiting same.

EXAMPLE 1

A solution composed of 240 pounds of Q-brand sodium silicate (28.5 weight percent $SiO_2$, 8.8 weight percent $Na_2O$ and 62.7 weight percent $H_2O$) and 300 pounds of water was continuously mixed with a second solution containing 7.3 pounds of $Al_2(SO_4)_3 \cdot xH_2O$ (16.7 weight percent $Al_2O_3$), 30 pounds of NaCl and 410 pounds of $H_2O$ in a mixing nozzle. The resultant gelatinous precipitate was discharged from the nozzle into an agitated 120 gallon vessel. The vessel was heated to 210° F. and held for 8 days while agitating at 24 r.p.m. The product was 90 percent ZSM-5 by X-ray diffraction. Chemical analysis of the product showed $SiO_2/Al_2O_3$ of 67.0. The crystallized product was washed essentially free of soluble salts by decantation, then filtered. The washed filter cake was dried at about 250° F. A portion of the dried cake was then blended with hydrated alpha-$Al_2O_3 \cdot H_2O$ and additional $H_2O$ in a muller mixer to obtain a mass of extrudable consistency. The ZSM-5 and the $Al_2O_3$ were blended in proportion to give 65 percent ZSM-5 and 35 percent $Al_2O_3$ in the final product. The blended mixture was then extruded thru $1/16''$ opening die plate using a ram type extruder. The extrudate was then dried at about 250° F. in air and then calcined for 3 hours at 700° F. in air. After cooling, the extrudate was ion exchanged 4 times, one hour each with 5 percent $NH_4Cl$ solution at room temperature using 5 cc. of solution/gm. of dried extrudate. The extrudate was washed free of soluble chlorides then dried at 250° F.

At a benzene/ethylene mole ratio of 2.8 and over the above ZSM-5 containing catalyst, conversion of ethylene at 40-70 percent was maintained for 14 days. The selectivity to ethylbenzene, diethylbenzene, and triethylbenzene gradually increased from about 90 percent to 95-97 percent. The inlet temperature was maintained at 750° F. for 12 days, and then increased to 775° F. as the conversion gradually decreased. Nitrogen diluent gas was added to the feed stream, and the nitrogen/ethylene mole ratio in the feed was 0.5. The ethylbenzene/polyethylbenzene weight ratio decreased from an initial value of 5.5 to about 3.5.

The reactor was left shut-down and liquid-full during a period. The run was continued later with the initial temperature being the same as the initial startup temperature, 750° F. Conversion of ethylene was about 25 percent. With the reduced conversion, the selectivity increased steadily from 97.5 percent at 25 percent conversion to about 99.5-100 percent at conversions below 10 percent. At the end of 20 days the temperature was raised from 750° F. to 800° F. and after 25 days from 800° F. to 850° F. After a total of 34 days on stream the run was ended. The catalyst was then regenerated by burning with an air stream to a final bed temperature of 1000° F.

EXAMPLE 2

These runs, indicating that higher space velocities and higher benzene/ethylene ratios reduced the formation of by-products and thus increased selectivity, were conducted at a WHSV of 42 lbs. total feed/hr.-lb. crystalline aluminosilicate with a benzene/ethylene mole ratio of 7.5.

The catalyst was that which was regenerated from Example 1. The only variable changed was the starting temperature at the reactor inlet. Changing this variable had a dramatic effect on the deactivation rate of the catalyst. At a starting inlet temperature of 600° F., conversions of ethylene of 30–40 percent were obtained for two days. The inlet temperature was raised to 650° F. at this point and ultimately to 750° F. after six days. A maximum conversion of ethylene of 50 percent was reached during the third day. After the fourth day the conversion remained below 5 percent until the run was terminated after 7 days. The selectivity during this run was in the range of 97 to 97.5 percent.

EXAMPLE 3

After catalyst regeneration by burning with an air stream to a final bed temperature of 1000° F., Example 3 was started under the same conditions as in Example 2 but with an initial inlet temperature of 700° F. Initial conversion was higher than that observed during Example 2. A maximum conversion dropped almost linearly by about 4 percent per day until the run was ended after 15 days at which point the conversion was about 18 percent.

During the tenth day of operation, the inlet temperature was raised from 700° F. to 750° F. with no apparent effect on the conversion or rate of deactivation. The weight ratio of ethylbenzene to polyethylbenzene increased from 7.5 to 10 when the temperature was raised, however.

During the twelfth day the reactor pressure was increased from atmospheric pressure to 25 p.s.i.g. with no discernible effect. Selectivity was in the range of 99 percent during the first 13 days of the run, after which it dropped to 97.0–97.5 percent. The run was ended after 15.5 days.

EXAMPLE 4

This run was started after the catalyst from Example 3 had been regenerated in the same manner as for Example 3 and with a reactor inlet temperature of 750° F. and a WHSV of 42 lbs. total feed/hr.-lb. catalyst. The initial conversion of ethylene was about 80 percent. This figure dropped to about 67 percent over a 37-day period. The conversion remained about 70 percent for about 30 days. During this period the selectivity initially in the range of 97–97.5 percent, rose and leveled off at 98.5–99.0 percent.

The run continued for 48 days. During the last 10 days a recycle feed comprising about 10 weight percent ethylbenzene was used as feedstock to simulate the second reactor in a series of 4. The product from runs in which benzene and ethylene were used as feeds was collected.

EXAMPLE 5

The product collected from Example 4 was then fed to the reactor starting on the thirty-seventh day of the run. Additional ethylene sufficient to give a benzene/ethylene ratio of 6.6 mole/mole was fed to the reactor.

Conversions dropped from about 65 percent to 55 percent when the feed was changed from benzene to recycle feed. This may be attributed to the lower concentration of benzene in the feed. The selectivity appeared to drop only slightly. The conversion was relatively stable, 52–54 percent, for 7 or 8 days before beginning to decline slightly. During the last day of the run, the temperature was increased to 775° F.

EXAMPLE 6

This run was made with catalyst that had been used and regenerated eight times in the manner used for Example 3.

The initial conditions for this run were similar to those for Examples 4 and 5 to determine if the catalyst had lost activity. The initial conversion was about 75 percent and decreased to about 69 percent after 8 days compared to conversions of 80 percent for the same periods of Example 4.

At this point the reactor pressure was increased to 50 p.s.i.g. which affected significant changes in unit performance. The ethylene conversion increased from about 70 percent to 90–95 percent and the ethylbenzene to polyethylbenzenes weight ratio (EB/PEB) increased from 12:1 to 22:1. The maximum observed reactor temperature also increased when the pressure was increased. The conversion remained over 90 percent for 21 days at which time the reactor pressure was increased to 260 p.s.i.g.

The ethylene rate was then increased which resulted in a noticeable drop in selectivity. This decreased the benzene to ethylene ratio to about 5.7. Later the space velocity was increased to approximately 62 and the benzene to ethylene ratio was increased to approximately 6.7 in an attempt to improve the selectivity. However, due to the design of the reactor system an increase in feed rate at a given catalyst bed inlet temperature also increases the temperature in the catalyst bed. The selectivity decreased even more at these conditions indicating a temperature effect on selectivity.

EXAMPLE 7

The feed to Example 6 was changed on the 43rd day to a feedstock that simulated a second reactor in series, i.e. about 18 weight percent ethylbenzene. The conversion dropped slightly to 85–90 percent and the selectivity dropped to 90–92 percent. The reactor inlet temperature was decreased in 20° F. steps from 750° F. to 710° F. which served to increase the selectivity to 97 percent. The run was terminated on the 53rd day.

EXAMPLE 8

This run was made using $\frac{1}{16}''$ extrudate of fresh hydrogen ZSM-5 catalyst prepared according to Example 1. The feed charge was benzene.

The conversion was 85–90 percent and the selectivity was about 99.5 percent. On the nineteenth day the reactor pressure was increased to about 260 p.s.i.g. at which point the conversion increased to 98+ percent. The benzene to ethylene ratio of the feed was reduced in steps from about 8:1 to about 5:1 by increasing the ethylene rate with no noticeable effect on conversion. However, the selectivity did decrease to about 98 percent at 5 to 1 benzene to ethylene ratio.

The maximum observed reactor temperature also increased as the benzene to ethylene ratio of the feed was decreased. During this run at the higher pressure it was evident that the bulk of reaction was occurring over a very small section of the bed. The temperature profile indicated the reaction was occuring over less than one-sixth of the catalyst bed. This run was terminated after 53 days.

EXAMPLE 9

The catalyst for the run was the regenerated catalyst of Example 8. The regeneration was conducted with steam used as an oxygen diluent to a final bed temperature of 1000° F. after 31 hours.

The run was started by lining out at the desired operating conditions with steam, then switching to benzene feed and ethylene.

The purpose of this run was to study the effect of reactor temperature on alkylation performance. The run was started at a reactor temperature of 650° F. The selectivity was poor and the catalyst appeared to deactivate rapidly as indicated by the decreased conversion of the 4th day.

The reactor temperature was increased to 700° F. on the 5th day and the performance improved. On the 9th day the temperature was increased to 725° F. On the 4th day of these conditions, the conversion dropped off and the temperature was increased to 750° F. and the conversion increased once again. The reactor temperature was subsequently increased in 25° F. increments to 875° F. The highest selectivity was obtained at 800° F. The ratio of ethylbenzene to diethylbenzene continued to increase as the temperature was increased. On the 37th day, the temperature was decreased to 820° F. and the benzene to ethylene ratio increased. The run was terminated on the 44th day.

EXAMPLE 10

The catalyst for this run was 58.5 g. of 1/16" extrudate containing about 2.93 g. of hydrogen ZSM-5 catalyst. This catalyst was prepared in the non-ion exchanged form essentially as in Example 1 and had the following analysis in the "dried-only" state:

| Component: | Wt. percent |
|---|---|
| $Al_2O_3$ | 2.23 |
| $SiO_2$ | 93.90 |
| C | 7.40 |
| N | 0.69 |
| Na | 1.40 |

The crystalline aluminosilicate zeolite was then diluted with alumina, mixed, mulled, extruded and dried. Precalcination was performed with nitrogen at a temperature of 700° F. for 3 hours. The extrudate was then ion exchanged with 5 percent aqueous ammonium chloride solution for 4 hours, water washed for 8 hours and then dried. It was again calcined with air at 1000° F. for 3 hours.

This example was performed to evaluate usefulness of catalyst with a low active ingredient, i.e. ZSM-5, concentration. A qualitative evaluation based on the temperature peak indicated very high activity for this 5 percent catalyst relative to the 65 percent catalyst of previous runs. During the 5th day, water injection was started to determine the feasibility of temperature control by water quench. The off gas rate began slowly and steadily increasing during the water injection. The reactor temperature was increased in 50° F. increments to 850° F. These temperature increases did slightly retard the deactivation but did not stop the steady increase in off gas. This run was terminated after 14 days and the catalyst was removed.

This invention is now illustrated with the specific examples outlined in the following table.

TABLE 4

[Vapor-phase alkylation of benzene with ethylene over hydrogen ZSM-5

| Example No. | Feed [1] | Inlet temp., °F. | Pressure, p.s.i.g. | WHSV [2] | Benzene ethylene mole/mole |
|---|---|---|---|---|---|
| 1 | 1 | 750-800 | Atmospheric | 7 | 2.8 |
| 2 | 1 | 600-750 | do | 42 | 7.5 |
| 3 | 1 | 700-750 | Atmospheric-25 | 42 | 7.5 |
| 4 | 1 | 750 | Atmospheric | 42 | 7.5 |
| 5 | 2 | 750 | do | 42 | 6.6 |
| 6 | 1 | 750 | Atmospheric-260 | 42-61 | 5.7-9.2 |
| 7 | 3 | 710-750 | 260 | 42 | 4.5 |
| 8 | 1 | 750 | Atmospheric-260 | 42 | 5-8 |
| 9 | 1 | 650-875 | 260 | 88 | 5-6 |
| 10 | 1 | 750 | 260 | 74 | 4-5 |

[1] Key to feed compositions in weight percent of total feed:

| Components | 1 | 2 | 3 |
|---|---|---|---|
| Light ends | | 0.05 | 0.02 |
| Benzene | 99.9 | | |
| Toluene | | 0.06 | 0.04 |
| Ethylbenzene | | 10.07 | 17.55 |
| Xylenes, cumene | | 0.15 | 0.16 |
| Others [3] | | 0.06 | 0.10 |
| Diethylbenzenes | | 1.24 | 1.45 |

[2] WHSV is measured in lb. total feed/hr.-lb. crystalline aluminosilicate.
[3] n-Propylbenzene, ethyltoluenes, secondary butylbenzene and trace unidentified components.

Further examples demonstrating the process of the present invention, and in particular the effect of pressure, are outlined as follows:

EXAMPLE 11

| | A | B |
|---|---|---|
| Reactor pressure, p.s.i.g | 0 | 50 |
| Catalyst (same as in Example 1) weight, g | 3.84 | 3.84 |
| Ethylene rate, g. mole/hr | 0.207 | 0.207 |
| Benzene feed rate, g. mole/hr | 9.16 | 9.16 |
| Reactor inlet temperature, °F | 750 | 750 |
| Maximum observed reactor temperature, °F | 820 | 845 |
| Product weight, g./hr | 155.2 | 156.8 |
| Liquid product composition, wt. percent: | | |
| Ethylbenzene | 9.34 | 12.93 |
| Diethylbenzenes | 0.80 | 0.53 |

EXAMPLE 12

| | A | B |
|---|---|---|
| Reactor pressure, p.s.i.g | 0 | 260 |
| Catalyst (same as in Example 8) weight, g | 9.88 | 9.88 |
| Ethylene rate, g. mole/hr | 0.657 | 0.645 |
| Benzene feed rate, g. mole/hr | 8.14 | 8.22 |
| Reactor inlet temperature, °F | 750 | 750 |
| Maximum observed reactor temperature, °F | 760 | 772 |
| Product weight, g./hr | 425.6 | 427.7 |
| Liquid product composition, wt. percent: | | |
| Ethylbenzene | 12.35 | 14.30 |
| Diethylbenzenes | 1.82 | 1.05 |

EXAMPLE 13

A transalkylation reactor separate from any alkylation reactor was set up using a ZSM-5 catalyst prepared as in Example 8. A feed defining a typical transalkylation feed as would be encountered in the process of the present invention was used. Such feed had the following major components (along with, of course, benzene) during the days of reaction as follows:

| | Feed composition, wt. percent (other than benzene) | | |
|---|---|---|---|
| Reaction days | Ethylene | Diethyl-benzene | Triethyl-benzene |
| 1-21 | 0.18 | 12.93 | |
| 22-25 | 0.06 | 15.14 | 0.22 |
| 26-32 | 0.05 | 19.01 | 0.29 |
| 33-40 | 0.17 | 24.72 | 0.38 |
| 41-50 | 0.35 | 37.25 | 0.54 |
| 51-57 | 0.16 | 14.60 | 0.15 |

The reactor inlet temperature was 800° F. for 6 days, 850° F. for 4 days, 800° F. for another 4 days, 750° F. for 32 consecutive days, then 800° F. from the 51st day to the 57th and final day. The reactor pressure was held constant at 260 p.s.i.g. During this 57 day experiment, the benzene to diethylbenzene mole ratio was about 11 for the first 21 days, 9 for 4 days, 7 for 7 days, 5 for 8 days and then 2.5 for the remainder of the experiment. The total feed weight hourly space velocity, based upon the weight of crystalline aluminosilicate, was approximately 40 for the first 3 days, increased to about 80 for 7 days and then decreased to about 40 for the remainder of the experiment. Conversions of benzene and diethylbenzenes to ethylbenzene were in the approximate range of 40 to 70 percent with excellent selectivity.

It will be noted from the examples of this invention that the vapor-phase alkylation of aromatic hydrocarbon compounds by contacting with the hydrogen ZSM-5 catalyst provides substantial benefits over alkylation with other catalysts known in the art for alkylation. For example, and possibly the most important fact, hydrogen ZSM-5 crystalline aluminosilicate zeolite catalyst exhibits markedly improved ageing properties. Instead of cycle periods of a few hours or days as has been the practice of the prior art, a cycle of weeks or months is possible.

In addition to increased selectivity toward a desired product, the hydrogen ZSM-5 catalyst used in the process of this invention is easily and effectively regenerated utilizing adiabatic burning in the presence of an inert dry gas as an oxygen diluent or suitable steam regeneration techniques. A suitable steam regeneration technique wherein steam, used as the oxygen diluent, is passed over the catalyst to be regenerated may be according to the following example:

| Time | Reactor inlet temperature, °F. | Mass velocity, lb./hr.-ft.² Steam | Air |
|---|---|---|---|
| 0 | 650 | 77 | 11 |
| 1.5 | 675 | 77 | 11 |
| 4.0 | 800 | 77 | 11 |
| 22.0 | 850 | 77 | 11 |
| 25.0 | 900 | 77 | 11 |
| 25.5 | 950 | 77 | 11 |
| 26.5 | 1,000 | | 11 |
| 27.5 | 1,000 | | 1 |
| 28.0 | End of regeneration | | |

Also, the hydrogen ZSM-5 catalyst employed in the process of this invention will withstand numerous regenerations without losing activity. Thus, it is contemplated that a catalyst life in commercial use may be several years.

Other advantages and improvements achieved by the process of this invention over the art are evident. They may be listed as follows:

(1) Pretreatment and drying of feed is not necessary.
(2) Extremely high space velocities are possible. This leads to higher yields with smaller reactors.
(3) Temperature control by product quenching is feasible.
(4) In the instance where benzene is alkylated with ethylene, selectivitiy improves as the benzene to ethylene ratio is increased. This is increasingly important for feed containing ethylbenzene and other alkylation products.
(5) A catalyst with a very low active ingredient concentration is useful.

It will be appreciated that the examples set forth above are merely illustrative and that aromatic hydrocarbons including aromatic hydrocarbons containing a non-polar substituent, may be alkylated in accordance with the present invention.

It will also be appreciated that the operating conditions for the alkylation reactions in accordance with the process of this invention, as exemplified in the foregoing examples, may be varied within the limits specified so that the process may be conducted in vapor phase, depending on product distribution, degree of alkylation, rate of catalyst deactivation, and operating pressures and temperatures, and that various modifications and alterations may be made in the process of this invention without departing from the spirit and scope thereof.

What is claimed is:

1. A process for effecting vapor-phase alkylation of an aromatic hydrocarbon charge selected from the group consisting of aromatic hydrocarbons and aromatic hydrocarbons containing a non-polar substituent which comprises contacting in a reaction zone said aromatic hydrocarbon charge with an alkylating agent under conditions effective for accomplishing said vapor-phase alkylation including an alkylation rector inlet temperature between about 650° F. and about 900° F., an alkylation reactor pressure between atmospheric and about 3000 p.s.i.g., employing a mole ratio of aromatic hydrocarbon charge to alkylating hourly space velocity between about 2 and 2000 in the presence of a catalyst comprising a crystalline aluminosilicate zeolite characterized by the X-ray diffraction pattern of Table 1 and a formula, expressed in terms of mole ratios of oxides, as follows:

$$0.9 \pm 0.2 \frac{M_2}{n} O : Al_2O_3 : 5\text{-}300 SiO_2 : zH_2O$$

wherein M is a cation predominately hydrogen, $n$ is the valence of M and $z$ is from 0 to 40, and contacting a portion of the effluent from said reaction zone comprising polyalkylaromatic compounds with aromatic hydrocarbon charge in a transalkylation reactor separate from said reaction zone under vapor-phase conditions effective for accomplishing transalkylation between said polyalkylaromatic compounds and said aromatic hydrocarbon charge including a transalkylation reactor inlet temperature between about 650° F. and about 900° F., a transalkylation reactor pressure between atmospheric and about 3000 p.s.i.g., employing a mole ratio of aromatic hydrocarbon charge to polyalkylaromatic compounds of between 1:1 and 16:1 and a weight hourly space velocity between about 10 and 1000 in the presence of a catalyst as above defined, said weight hourly space velocities being based upon the weight of said crystalline aluminosilicate zeolite.

2. The process of claim 1 wherein the alkylation reactor inlet temperature is between 700° F. and 850° F. and the alkylation reactor pressure is between about 25 and 450 p.s.i.g.

3. The process of claim 1 wherein the crystalline aluminosilicate zeolite is characterized by a $SiO_2:Al_2O_3$ ratio between about 5 and 100.

4. The process of claim 1 wherein the crystalline aluminosilicate zeolite is combined in an amount between about 1 and about 90 weight percent in a binder therefor.

5. The process of claim 4 wherein said binder is alumina.

6. The process of claim 1 wherein said alkylating agent is an olefin.

7. The process of claim 6 wherein said olefin is ethylene and said aromatic hydrocarbon charge is benzene.

8. The process of claim 7 wherein the alkylation reactor inlet temperature is between 700° F. and 850° F. and the alkylation reactor pressure is between about 25 and 450 p.s.i.g.

9. The process of claim 7 wherein the crystalline aluminosilicate zeolite is characterized by a $SiO_2:Al_2O_3$ ratio between about 5 and 100.

10. The process of claim 7 wherein the crystalline aluminosilicate zeolite is combined in an amount between about 1 and about 90 weight percent in a binder therefor.

11. The process of claim 10 wherein the crystalline aluminosilicate zeolite is combined in an amount between about 5 and about 80 weight percent in a binder therefor.

12. The process of claim 11 wherein said binder is alumina.

13. The process of claim 1 wherein said reaction zone comprises a series of adiabatic reactor stages.

14. The process of claim 13 which comprises the additional step of contacting the effluent from said adiabatic reactor stages with a quench comprising aromatic hydrocarbon charge whereby the heat of reaction is dissipated between said stages.

15. The process of claim 14 wherein said quench comprises a portion of a condensate from a high pressure steam condenser, the feed stream to which comprises effluent from the final reactor stage of said series of adiabatic reactor stages and effluent from said transalkylation reactor, and a portion of the heavier separated portion of the condensate from a low pressure steam condenser, the feed stream to which comprises the uncondensed portion of the feed stream to said high pressure steam condenser.

16. The process of claim 14 wherein the reactor first stage inlet temperature is between 700° F. and 850° F. and the reactor pressure is between about 25 and 450 p.s.i.g.

17. The process of claim 16 wherein the crystalline aluminosilicate zeolite is combined in an amount between about 1 and about 90 weight percent in a binder therefor.

18. The process of claim 17 wherein said binder is alumina.

19. The process of claim 16 wherein said alkylating agent is an olefin.

20. The process of claim 19 wherein said olefin is ethylene, said aromatic hydrocarbon charge is benzene, said quench comprises benzene and said polyalkylaromatic compounds are polyethylbenzenes.

21. The process of claim 20 wherein the crystalline aluminosilicate zeolite is characterized by a $SiO_2:Al_2O_3$ ratio between about 5 and 100.

22. The process of claim 21 wherein the crystalline aluminosilicate zeolite is combined in an amount between about 1 and about 90 weight percent in a binder therefor.

23. The process of claim 22 wherein the crystalline alumininosilicate zeolite is combined in an amount between about 5 and about 80 weight percent in a binder therefor.

24. The process of claim 23 wherein said binder is alumina.

25. The process of claim 1 which comprises the additional step of regenerating said crystalline aluminosilicate zeolite by contact with steam as the major inert diluent carrier of oxygen in controlled burning of said zeolite to remove coke and restore catalytic activity.

26. The process of claim 13 which comprises the additional step of regenerating said crystalline aluminosilicate zeolite by contact with steam as the major inert diluent carrier of oxygen in controlled burning of said zeolite to remove coke and restore catalytic activity.

27. The process of claim 14 which comprises the additional step of regenerating said crystalline aluminosilicate zeolite by contact with steam as the major inert diluent carrier of oxygen in controlled burning of said zeolite to remove coke and restore catalytic activity.

28. The process of claim 15 which comprises the additional step of regenerating said crystalline aluminosilicate zeolite by contact with steam as the major inert diluent carrier of oxygen in controlled burning of said zeolite to remove coke and restore catalytic activity.

References Cited

UNITED STATES PATENTS

| | | | |
|---|---|---|---|
| 3,476,821 | 11/1969 | Brandenburg et al. | 260—672 |
| 3,578,723 | 5/1971 | Bowes et al. | 265—672 T |
| 3,637,880 | 1/1972 | Burress | 260—672 T |
| 3,660,309 | 5/1972 | Hayes et al. | 252—455 Z |
| 3,677,973 | 7/1972 | Mitsche et al. | 260—672 T |

CURTIS R. DAVIS, Primary Examiner

U.S. Cl. X.R.

260—671 R, 671 C, 671 P; 252—455 Z

PO-1050
(5/69)

UNITED STATES PATENT OFFICE
CERTIFICATE OF CORRECTION

Patent No. 3,751,504            Dated August 7, 1973

Inventor(s) P. E. Keown, C. C. Meyers and R. G. Wetherold

It is certified that error appears in the above-identified patent and that said Letters Patent are hereby corrected as shown below:

| | |
|---|---|
| Column 2, lines 51-52, | "a a unique" should be --a unique-- |
| Column 4, line 44, | "dicraction" should be --diffraction-- |
| Column 8, line 74, | "wherein" should be --where--. |
| Column 15, line 61, | after word "alkylating" insert --agent in the approximate range of 1:1 to 20:1 and a weight --. |

Signed and sealed this 19th day of March 1974.

(SEAL)
Attest:

EDWARD M. FLETCHER, JR.           C. MARSHALL DANN
Attesting Officer           Commissioner of Patents